Oct. 19, 1965  A. R. NORDEN  3,213,327
CIRCUIT BREAKER AND PANELBOARD
Filed April 3, 1962  5 Sheets-Sheet 1

INVENTOR.
ALEXANDER R. NORDEN

BY *Richard W. Rabkin*

ATTORNEY

Oct. 19, 1965   A. R. NORDEN   3,213,327
CIRCUIT BREAKER AND PANELBOARD
Filed April 3, 1962   5 Sheets-Sheet 3

INVENTOR.
ALEXANDER R. NORDEN
BY
*Richard W. Rathin*
ATTORNEY

Oct. 19, 1965   A. R. NORDEN   3,213,327
CIRCUIT BREAKER AND PANELBOARD
Filed April 3, 1962

INVENTOR.
ALEXANDER R. NORDEN
BY
ATTORNEY

Oct. 19, 1965   A. R. NORDEN   3,213,327
CIRCUIT BREAKER AND PANELBOARD
Filed April 3, 1962   5 Sheets-Sheet 5
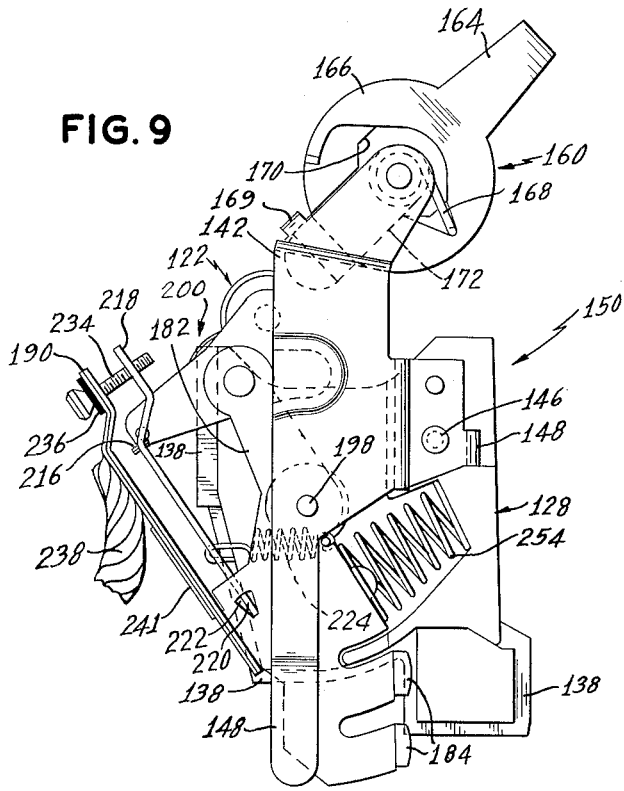
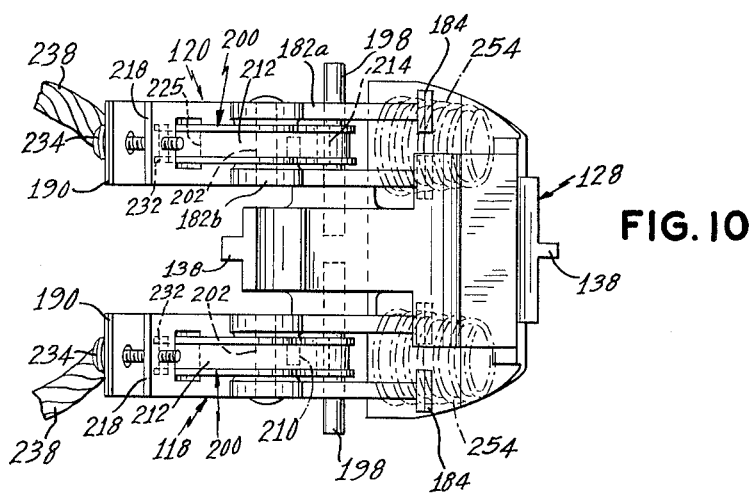
INVENTOR.
ALEXANDER R. NORDEN
BY
ATTORNEY United States Patent Office 3,213,327
Patented Oct. 19, 1965

1

3,213,327
CIRCUIT BREAKER AND PANELBOARD
Alexander R. Norden, New York, N.Y., assignor to Federal Pacific Electric Company, a corporation of Delaware
Filed Apr. 3, 1962, Ser. No. 184,739
8 Claims. (Cl. 317—119)

This invention relates to panelboards which comprise an assembly of circuit protective devices, a bus structure and an enclosure. It also relates to the circuit protective devices utilized in such panelboards.

An object of this invention is the provision of a panelboard and main circuit protective device which utilizes the same space as the prior panelboard without said main protective device.

Another object of this invention is the provision of a panelboard and complementary main circuit protective device capable of insertion into existing panelboard enclosures without major modification thereof.

A further feature of this invention resides in the provision of a main circuit protective device having a configuration complementary to the line terminal end of the panelboard bus assembly.

A further object of this invention is to provide a main circuit protective device having its line and load terminals adjacent one side thereof.

A still further object of this invention is the provision of an improved two pole circuit breaker of the type having a triangular configuration of contact arm, a latch, and an actuator, having greatly increased current carrying capacity and being adapted to easy and systematic assembly.

Yet another object of this invention is a provision of a circuit breaker having plural case-mounted contacts capable of independent self-seating movement relative to each associated movable contact arm.

The nature of the invention, and its further objects and features of novelty will be clear from the following description of an illustrative embodiment thereof, in which reference is made to the accompanying drawings. In the drawings:

FIG. 9 is a side view of a circuit breaker sub-assembly removed from the housing, and;

FIG. 10 is a top view of the sub-assembly of FIG. 9 with some parts omitted for clarity.

Figure 1:
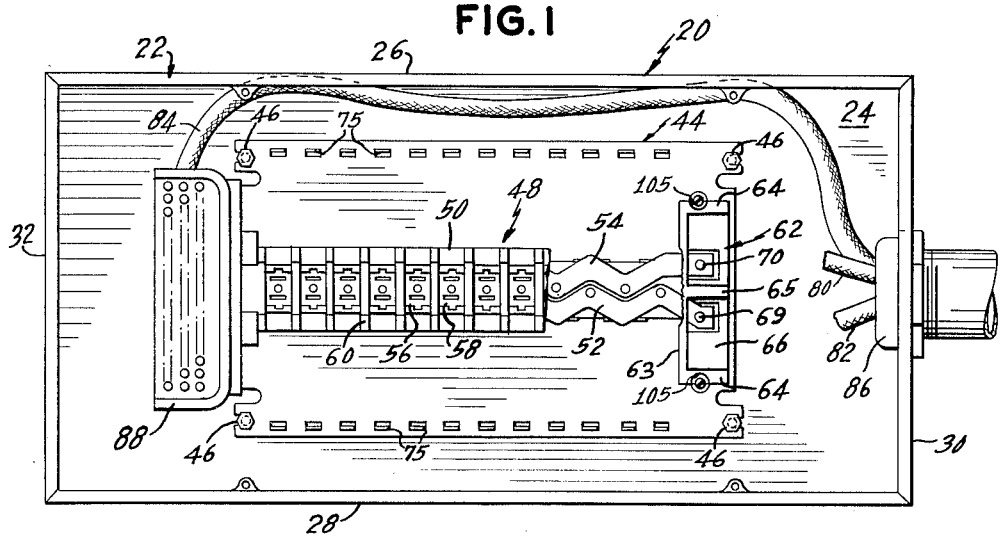
FIG. 1 is a plan view of a standard panelboard with the cover removed and with other parts broken away.

The panelboard 20, illustrated in FIG. 1, comprises a rectangular enclosure 22 having a back wall 24, elon-

2 gated parallel side walls 26, 28, and end walls 30, 32. A cover 34 is secured to side-wall flanges by screws 36. The cover 34 of the illustrative embodiment is provided with a door 38 which has a hinge 40 securing the door to a raised portion of the cover. Door 38 overlies a depressed portion of the cover constituting trim plate 42. Such construction has been described in detail in my U.S. Patent 2,739,272 assigned to the assignee hereof.

An elongated two part mounting panel 44 is releasably secured by screws 46 to the back wall 24 of the enclosure. Bus assembly 48 is united to panel 44 and extends lengthwise thereof. The bus assembly includes major insulator 50 and bus bars 52, 54. In the illustrative embodiment of the invention the bus bars are arranged in zig-zag formation providing modular sequence-phased terminal formations 56, 58, the terminal formations being alternately connected to the bus bars 52, 54 therebelow. Interphase barriers 60 integral with insulator 50 extend upwardly between the terminal formations 56, 58 to isolate them electrically and mechanically. Bus assemblies of this type are shown and described in my copending application S.N. 762,156 now Patent No. 3,041,505, filed September 19, 1958 and assigned to the same assignee as the present invention. The bus bars 52, 54 are enclosed in the insulator 50 and terminate within a terminal housing portion 62 formed of insulation material integral with insulator 50 and secured to the panel 44.

The bus terminal housing 62 has a back wall 63, opposed side walls 64, a center divider or barrier 65 and a bottom wall 66. The terminal ends of the bars are exposed to the right of the insulator wall 63 and are separated by the divider 65. Screws 69, 70 are threaded into the bus bars 52, 54 and extend upwardly, above the bottom 66 of the housing 62. Conductive collars 71, 72 are in contact with the bars 52, 54 and are retained in bus assembly 48 by their flanges 73 which are captive in recesses 74. The collars serve as input means i.e., as the points of connection between the bus assembly 48 and a power source.

Figure 2:
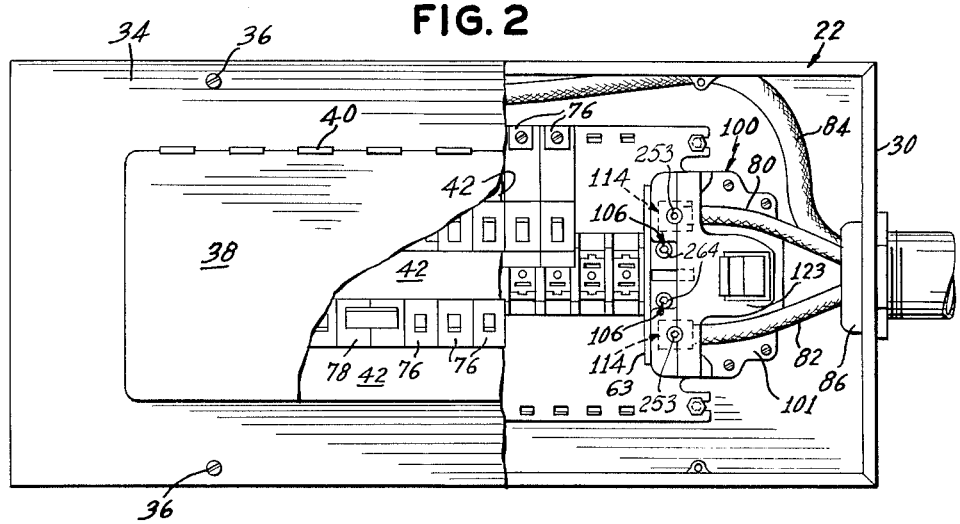
FIG. 2 is a plan view of the panelboard of FIG. 1 with the cover and trim plate in place and with portions broken away, a main circuit breaker and some branch circuit breakers being mounted therein.

The panel 44 has a plurality of mounting means or hooks 75, aligned with the terminal formations 56, 58 provided on the bus assembly 48. The hooks provide mounting positions for modular branch-circuit protective devices 76 which may be molded case circuit breakers and the like. In the illustrative embodiment single pole circuit breakers 76 and multi-pole circuit breaker 78 (FIG. 2) are provided for branch-circuit protection. The circuit breakers are installed by fitting hook element 75 into a recess in the breaker casing and pivoting the breaker so as to drive the stab terminal into contact with one of the terminal formations 56, 58. The details of such breaker installation are covered in U.S. Patent 2,647,225 to Cole et al. which is assigned to the assignee hereof.

The service wires 80, 82, 84 enter the enclosure 22 through bushing 86. In single phase 220/110 volt circuits wire 84 is designated as the neutral, while wires 80, 82 are the "hot" wires of the circuit. A plurality of knockouts, not shown, are provided in the walls of the enclosure so that the branch circuit conductors may readily enter for connection to the branch circuit breakers 76, 78. Neutral bar assembly 88 is mounted on the panel 44 and provides a connection point between the neutral wire 84 and the various branch circuit neutral wires, not shown.

Figure 4:
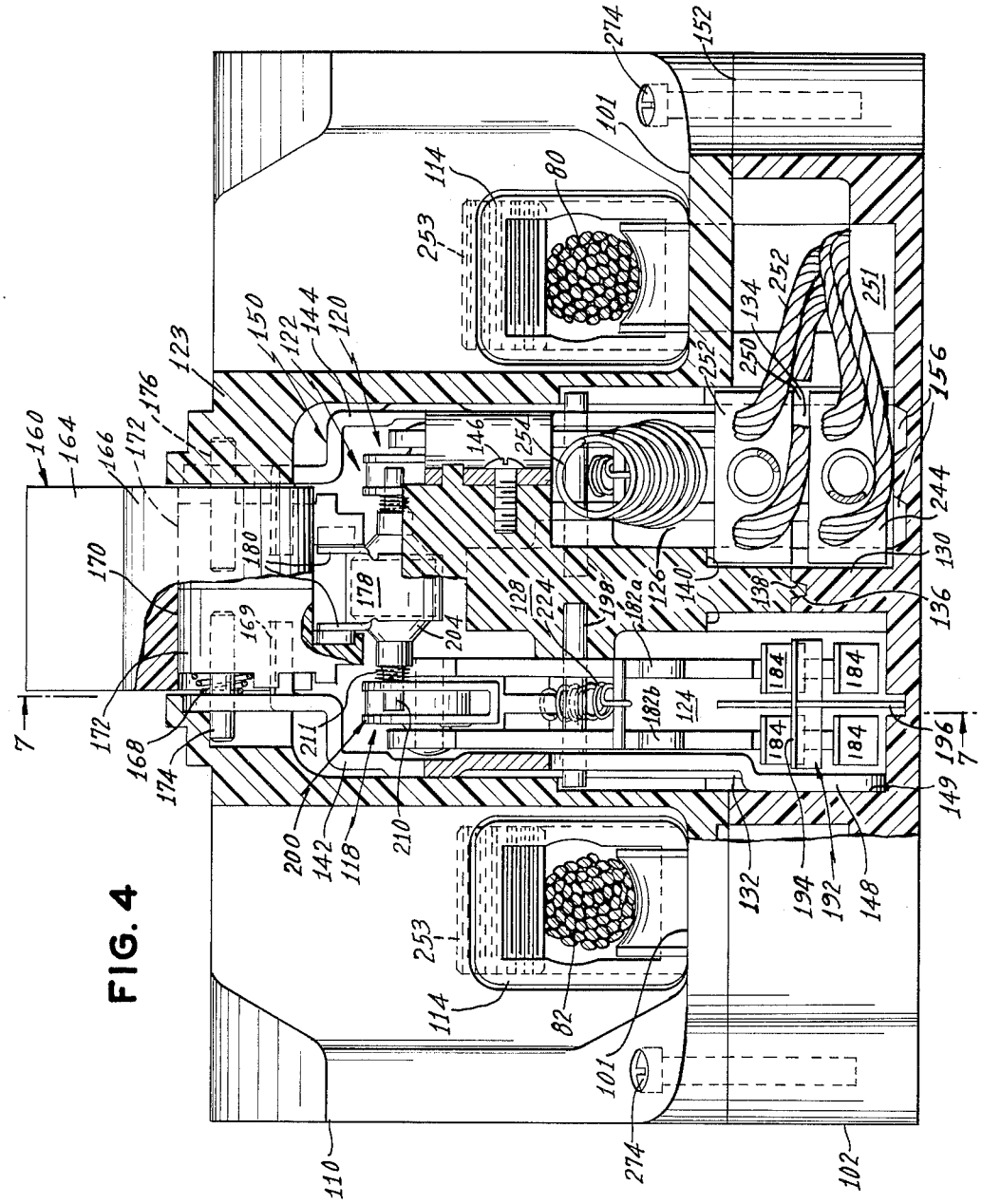
FIG. 4 is an elevation of a main circuit breaker as viewed from the left in the panelboard of FIG. 3 (this being hereinafter referred to as the front of the circuit breaker) with some parts broken away and shown in section, and other parts omitted in the interests of simplicity and clarity.

The panelboard thus far described is essentially a standard commercial unit. Wire 84 is connected to the neutral bar assembly 88 in usual practice. Heretofore "main" overload protection for the specific panelboard shown has always been provided by a fuse-and-switch combination or a circuit breaker such as the so-called E-frame circuit breaker. A separate enclosure has been required for the "main" overload protector, with the supply line connected to the line terminals of the E-frame circuit breaker (for example) and with the load terminals of the E-frame breaker connected by wires 80 and 82 to bus bars 52 and 54 at terminal screws 69 and 70. This standard panelboard when used with separate "main" protection has so-called solderless connectors (not shown) mounted on screws 69 and 70 and held in place by nuts. These connectors resemble connectors 114 (FIG. 4). Such connectors receive the line wires 80 and 82 extending from wall 30. This connection is required by the electrical code of the Underwriters' Laboratories to be spaced from end wall 30 by a certain minimum distance. The illustrated panelboard continues to be useful as a standard item, to be used in the usual manner just described.

Figure 5:
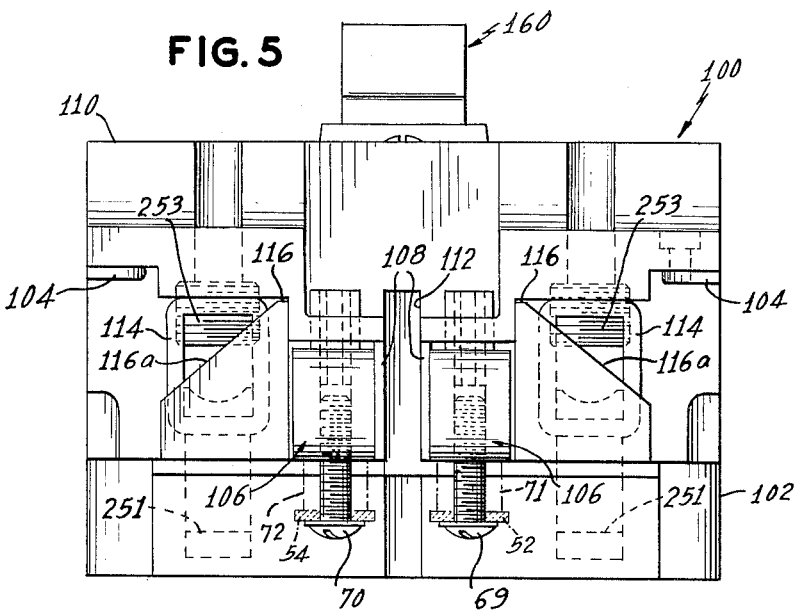
FIG. 5 is a rear elevation of the main circuit breaker of FIG. 4 (as viewed from the right in FIG. 3)
Figure 6:
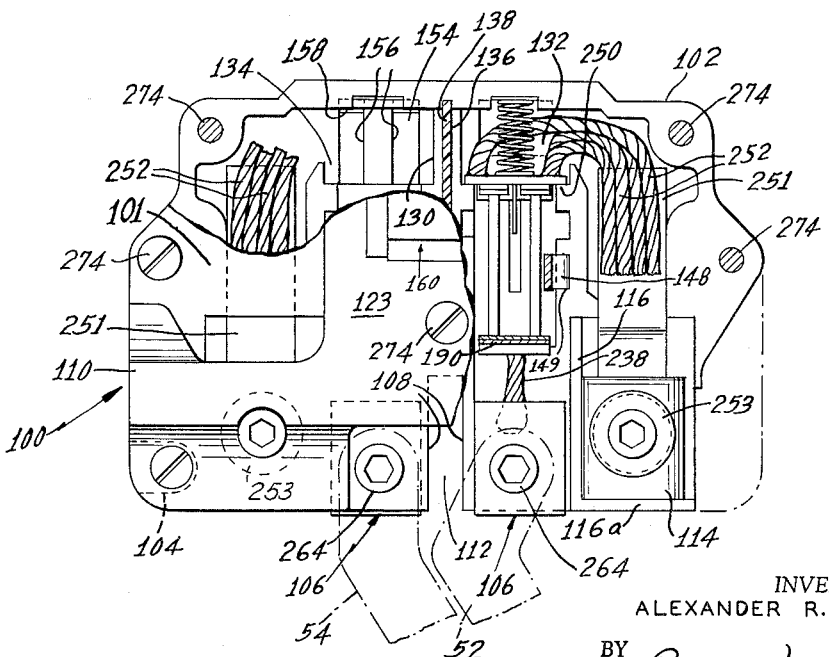
FIG. 6 is a top view in partial section of the circuit breaker of FIG. 4.

In FIG. 1 the usual solderless connectors supplied with the panelboard have been either omitted or removed from screws 69 and 70. A novel circuit breaker 100 as a "main" circuit protective device is mounted (FIG. 2) on screws 69 and 70 and is received in bus-assembly housing 62. Wires 80 and 82 are received in line connectors 114 of the circuit breaker (FIG. 2) and the load connectors 106 of the "main" breaker 100 are fixed to terminal screws 69 and 70 of the bus assembly. Connectors 114 are just as far from wall 30 as the usual solderless connectors (here omitted) on bus-terminal screws 69 and 70. It appears accordingly, that line terminals 114 and load terminals 106 are substantially aligned in a common plane parallel to end wall 30 of the enclosure. Stated otherwise, the load terminals and the line terminals of circuit breaker 100 are substantially in line and are adjacent to the rear of the circuit breaker as best shown in FIG. 5 and FIG. 6. Load terminals 106 are closely adjacent to each other and line terminals 114 are relatively remote from each other. All four terminals have threaded fasteners accessible from the top of the circuit breaker. Terminals 106 serve not only as load connectors for the circuit breaker, but provide mechanical fastening means for holding the circuit breaker in place. Thus, the required mechanical and electrical connections of the circuit breaker are readily accessible from the top, when the circuit breaker 100 is in place in cooperative relation to walls 63, 64 and 65 of the bus assembly terminal housing 62. Line connectors 114 open toward end wall 30 (FIG. 2), to receive line or supply wires 80 and 82. These wires extend over a pedestal portion 101 of the housing, and the wires 80 and 82 flank a center housing 123 of the circuit breaker.

The circuit breaker 100 complements the line-terminal end of the bus-assembly physically; it accommodates line wires 80 and 82 and provides connecting points spaced the required distance from end wall 30 of the enclosure; and circuit breaker 100 provides "main" protection for the bus assembly. There is no need to resort to a separate enclosure for "main" overload protection. No special over-size distribution panelboard and enclosure are needed. And there is no need to mount a "main" circuit breaker in place of a number of branch circuit breakers so as to occupy some of the modular spaces along the bus assembly as is sometimes done with smaller breakers up to 100 amperes. The illustrated circuit breaker, in a practical form, is rated at 200 amperes. The panelboard remains largely the same, and still the complementary forms of the circuit breaker and the line-terminal end of the bus assembly, plus the line and load connector positioning, make possible the integration of "main" protection in the panelboard.

Figure 3:
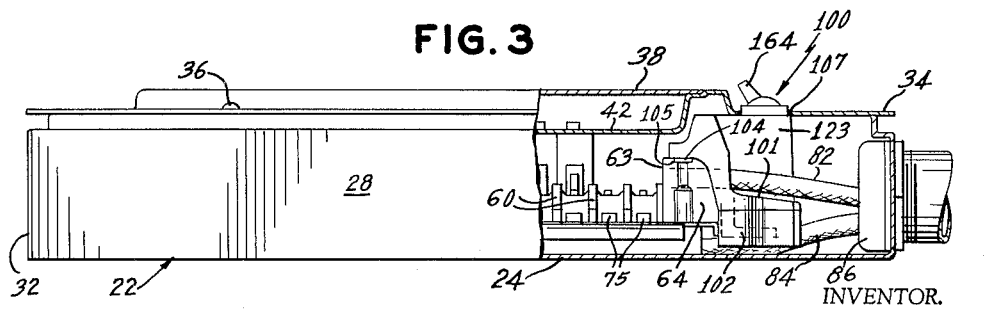
FIG. 3 is a side view of the panelboard of FIG. 2 with some parts broken away and other parts omitted.

The main circuit breaker 100 has a base 102 formed of insulating material. The left-hand part of this base (FIG. 3) conforms to the housing 62 of the bus bar assembly 48 and the right-hand part of the base depends across the end of panel 44 and below the level at which the branch circuit breakers 76 and 78 are mounted, as is shown in FIG. 3. Circuit breaker 100 is additionally interlocked mechanically with bus-terminal housing 62 by depending bosses 104 (FIG. 5) formed on circuit breaker cover 110 of molded insulation, these bosses being received in complementary recesses 105 in the side walls 64 of the housing 62. The breaker is mechanically and electrically connected to the bus assembly 48 by load terminals 106 of the circuit breaker. The operating handle 164 of the breaker is accessible through an opening 107 provided in the cover 34 adjacent the door 38.

The breaker load terminals 106 are separated from one another by spaced walls 108 (FIGS. 5 and 6) forming part of the breaker base 102 and are retained between the base 102 and the breaker cover 110. The breaker base 102 and cover 110 are made of any suitable insulating material. The center divider 65 of terminal housing 62 of the bus assembly is received in the space between the load terminal insulating walls 108 of the base, this space being extended by a contiguous recess 112 in the circuit breaker cover 110.

The line terminals 114 of the circuit breaker are in a line with and closely adjoin the load terminals 106 (FIGS 5 and 6). The load and line terminals are separated from one another by upstanding walls 116 integral with base 102. The separating wall 116 has a right angled portion 116a (FIG. 5) which extends to the rear of the line terminals 114 and acts as a barrier and stop as will be explained in detail later.

The center housing 123 of the breaker contains the circuit breaker mechanism (FIGS. 4, 6, 7 and 8). The housing extends upwardly from the pedestal portion 101 and is disposed at the right of the row of load and line terminals 106, 114 as viewed in FIGS. 2 and 3. The terminals 106, 114 are adjacent one side of the pedestal 101, at the left of pedestal portion 101 as viewed in FIG. 7. Two identical single pole circuit breaker mechanisms 118, 120 (FIG. 4) form a two-pole breaker operated by a common drive or operating toggle 122. These two mechanisms 118, 120 are provided in separate isolated compartments 124, 126 (FIG. 4) formed in the center housing 123 by the cooperation of the cover 110, base 102 and a central insulator block 128. Internal vertical central wall 130 of base 102 separates a pair of spaced cavities 132, 134, forming the bottom of the mechanism compartments. A continuous groove 136 is formed in the upper edge of the wall 130 and also in the adjacent front and back walls of the base 102. The central insulator 128 has a median projection or rib 138 which mates with the groove 136 in the wall 130 and effectively seals the compartments 124, 126 from one another. Central insulator 128 also has a pair of opposed transversely extending shoulder portions 140 which overlie the base cavities 132, 134 to form arcing chambers. Insulator 128 bears a peripheral continuation of the projection 138 which cooperates with the cover 110.

Figure 7:
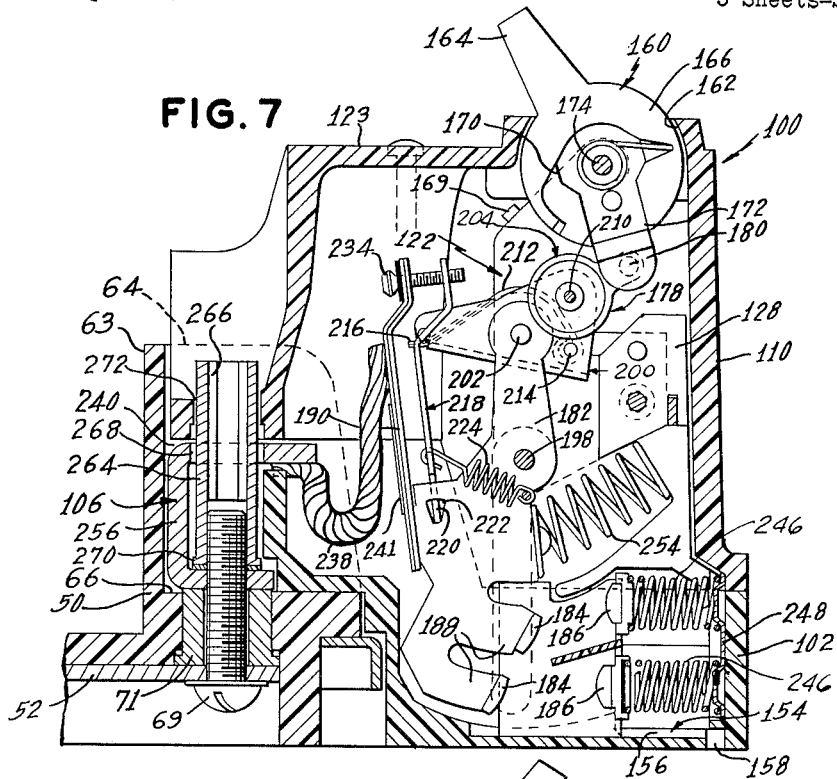
FIG. 7 is a side view of the circuit breaker of FIGS. 4–6 in the "open circuit" position as viewed from the plane 7—7 of FIG. 4.
Figure 8:
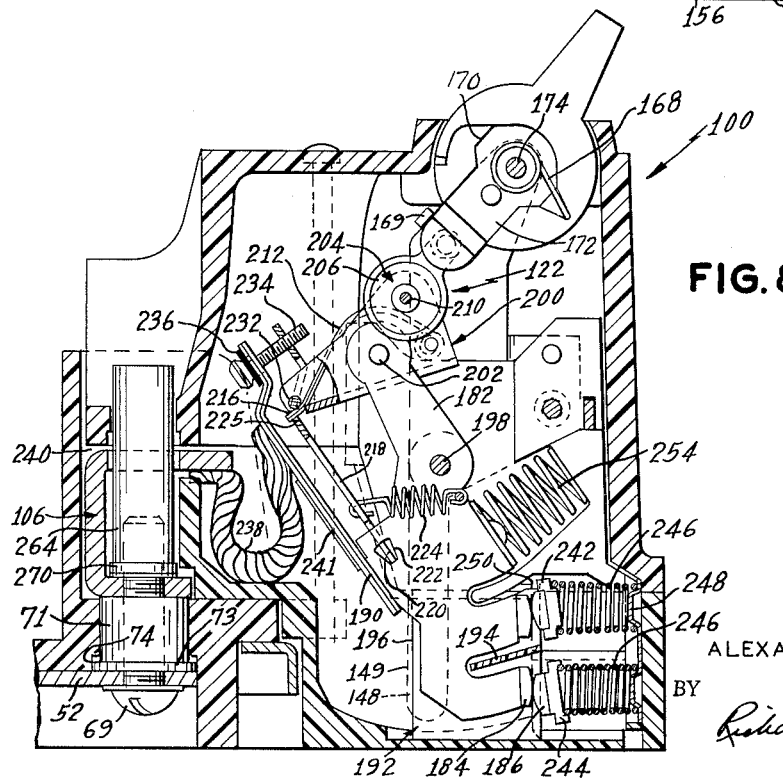
FIG. 8 is a side view similar to FIG. 7 showing the circuit breaker in the "closed circuit" position.

Each of the breaker mechanisms 118, 120 is partly supported by an independent side bracket or frame plate 142, 144 respectively, which is secured by screws 146 (FIGS. 4 and 9) to the center insulator 128. In FIGS. 7 and 8 side bracket or frame plate 142 has been removed. Each side frame plate has a locating tongue 148 that enters a complementary recess 149 in the insulator. The central insulator 128 together with the circuit breaker mechanisms 118, 120 forms a subassembly 150 (FIG. 9) which is inserted as a unit into the base 102. This sub-assembly and each of the mechanisms are vertically elongated from the handle 164 at the top, to the contacts that operate in the arcing chamber in base 102, so as to occupy the space within central housing 123. The junction or parting line 152 (FIG. 4) between the breaker cover 110 and base 102 is generally perpendicular to the direction of operation of the circuit breaker mechanisms 118, 120. Arc exhaust passages or vents 154 (FIG. 7) are formed of channels 156 and communicating ports 158 that open at the bottom face of base 102. Under the vent ports of the circuit breaker, the enclosure advantageously has a coating or sheet of insulation (not shown).

Main handle 160 is located in a complementary aperture 162 in the cover 110 (FIGS. 7 and 8) and has a manual lever portion 164 joined to a cylindrical barrel or body portion 166. Indicia, not shown, may be placed on the portion of the barrel 166 visible through the aperture 162, to indicate the "off" and "on" positions of the breaker mechanisms. Handle-return torsion spring 168 (FIG. 8) is positioned adjacent the barrel 166 and engages both the barrel and a side frame 142 adjacent thereto. Handle stops 169 are provided on each bracket 142, 144. A T-shaped recess 170 (FIG. 7) formed within the barrel 166 receives and retains a pair of complementary opposed sub-handles 172 in position. Each sub-handle 172 receives one end of a respective handle pivot-pin 174, 176 (FIG. 4). The other end of pivot pin 174, 176 is supported in the adjacent side bracket or frame plate 142, 144. Sub-handles 172 are coupled together by the handle so as to act as a unitary part of the handle, and engage ball-holding link 178 at their other end. Link 178 has a pair of up-standing parallel arms having outwardly directed pivot portions 180 formed for pivotal engagement with recesses provided in the sub-handles 172. Handle 160 with its sub-handles 172 and ball-holding link 178 form an operating toggle 122. The knee of the toggle is at pivot portions 180, at the junction of the sub-handles and the ball-holding link 178.

Each of the circuit breaker mechanisms 118, 120 is identical and therefore only one will be described in detail. Referring to FIGS. 7 and 8, the circuit breaker mechanism 118 includes a movable arm 182 carrying plural contact elements 184 at one end. In the illustrative embodiment each contact arm carries four contact elements 184 (FIG. 4). Companion or stationary contacts 186 are mounted in the breaker base 102 for cooperation with the movable contacts 184. The contact arm 182 is made in the form of a pair of identical plates 182a and 182b (FIGS. 4, 9 and 10) formed from conductive metal such as copper and joined together electrically and mechanically at a "bight" portion by the main bimetal 190. Each sub-arm 182 has a pair of vertically spaced contact mounting elements 188. The elements 188 on adjacent sub-arms are spaced horizontally from one another. A cruciform barrier 192 (FIGS. 4, 7 and 8), made of arc resistant insulating material, is positioned in the base 102 adjacent the companion contacts. In the closed circuit condition of the breaker (FIG. 8) the barrier's horizontal web 194 is between the vertically spaced mounting elements 188 and the barrier vertical web 196 is between the sub-arms 182a and 182b. Each barrier 192 sub-divides its arcing chamber into four sub-chambers.

Contact arm 182 (FIGS. 4, 9 and 10) is mounted for pivotal movement on its own pivot pin 198 which has one bearing in side bracket 142 and another pivotal bearing in the center insulator 128. A bell crank or actuator 200 has a pivot 202 to one end of the contact arm 182, between the sub-arms 182a and 182b. Ball lever 204 (FIGS. 4, 7 and 8) has a generally spherical center insulator section 206 with two metal pins 210 extending therefrom in opposite directions. Each pin 210 is received in an opening one wall of the actuator, adjacent the ball lever. The pin 210 only enters one aperture in the actuator. The pins 210, which contact the actuators in both poles, are insulated from one another by the body of the link 206. Ball lever 204 is centered between the actuators of the two mechanisms 118, 120 by springs 211 (FIG. 4) which are provided about pins 210 between the actuators 200 and the insulator section 206. The ball-holding link 178 and each actuator 200 form a secondary toggle.

Each actuator 200 carries a compensating bimetal 212 (FIG. 8) secured thereto by an eyelet 214. The other end of the compensating bimetal has a latch surface 216 arrested by a latching edge 225 of a rectangular hole in armature 218. This armature is of magnetic material, pivotally supported between the sub-arms 182a, 182b of the contact arm 182. Armature 218 has ears 220 which are positioned in slots 222 in the sub-arms to allow pivotal movement of the armature with respect to the contact arm 182. Tension spring 224 is hooked to the armature 218 and to a pin fixed to contact arms 182a, 182b and biases the armature in the latching direction, clockwise as viewed in FIGS. 7, 8 and 9.

Actuator 200 is generally U-shaped (FIG. 4) having side walls connected by a bight portion. The latch end of compensating bimetal 212 is supported in the actuator by the round pin 232 (FIG. 8) whose ends are rotatably mounted in notches formed in the actuator.

Calibrating screw 234 (FIGS. 7, 8, 9 and 10) is threaded into the free end of the armature 218. The screw body passes loosely through an aperture in an insulative member 236 secured to the free end of the bimetal 190 but the head of the screw engages member 236 under certain conditions to be described later. Parallel lengths of flexible conductive braid 238 extend from the bimetal 190 to the load terminals 106 of the breaker through passage 240 between base 102 and cover 110. A thin, flexible sheet of insulation 241 (FIGS. 7, 8 and 9) mechanically fixed to the bimetal as by tiny rivets (not shown) remote from braid 238 prevents the braid from engaging the bimetal 190, to prevent by-passing of current which might otherwise flow through only part of the bimetal.

Referring to FIGS. 4 and 8, the stationary or companion contact elements 186 for each breaker mechanism are arranged as two horizontal pairs and mounted on conductive bars 242, 244. Each bar is independently mounted and is resiliently urged toward both plates 182a and 182b of one contact arm by a centered spring 246 which is the over-travel and contact pressure spring. The springs 246 are themselves positioned by a plate 248, retained in the base, plate 248 having bosses that enter and locate a corresponding end of each spring 246. The forward movement of the bars 242, 244 is limited by engagement of the ends of these bars with stops 250 integral with base 102. The contacts 186 are connected to the contoured conductor member 251 (FIGS. 4, 5 and 6) by parallel lengths of flexible conductive braid 252. Conductor 251 is loosely received in the line terminal 114. The current path in the base 102 (FIG. 6) from the nominally stationary contacts to the line terminals 114 is therefore in the form of a "J," having a straight portion and a reverse-bend portion. The service wires 80, 82 and respective conductors 251 are clamped together by terminal screws 253. Service wires 80 and 82 extend above pedestal portion 101 of the circuit breaker while braid 252 and conductors 251 are contained in the pedestal portion.

The load terminals 106 of the breaker which connect the breaker to the bus assembly 48 are of novel construction and are designed to allow variation in the position of the bus assembly with respect to the housing 62 and with respect to the breaker without placing undue stress on either. Referring to FIG. 7, load terminal 106 comprises an inverted J-shaped body member 256 of copper having an aperture in the lower shorter leg to freely receive and clear a respective screw 69, 70 projecting upward from the bus assembly 48. The long leg of the member 256 extends loosely through passage 240 and braid 238 is welded thereto. The cover 110 retains the terminal 106 in the breaker but a limited amount of freedom is given the terminal or connector 106 to move relative to the breaker. A special nut 264, having a hexagonal internal socket 266 at its upper end and having a female screw thread formed at the other end is positioned within an aperture 268 in the J-shaped member 256. Nut 264 is retained in the connector by the cover 110. The nut has a flange 270 which will pass through the aperture 268 in the terminal but which is too large to pass through the corresponding aperture 272 in the cover 110.

Thus when the cover 110 is secured to the base 102 by screws 274 the special nut is retained into position and cannot be withdrawn from the breaker.

The main breaker 100 is installed in the panelboard (FIG. 2) by nesting it in the insulated housing 62 formed on the end of the bus assembly 48. Connection to the bus structure 48 is made by driving the flange nuts 264 against the collars 71, 72. Since the load terminals 106 are loosely held in the breaker housing they are able to move laterally and transversely as well as vertically and horizontally to compensate for variation in positions of the screws 69, 70 to which they are connected. However the breaker cannot be lifted to raise bosses 104 out of companion formations in the bus terminal housing, so that after load-terminal connection is made between the breaker and the bus assembly, the breaker is mechanically fixed in its operative position. The line wires 80 and 82 are then connected to the line terminals in a conventional manner. The neutral wire 84 is connected to the neutral assembly 88 as shown in FIG. 1. The metal cover 34 of the enclosure is then mounted, after installing the required branch circuit breakers 76 and 78. Handle 164 passes through the opening 107 in the cover.

The mode of operation of the illustrative circuit breaker may now be described. The circuit breaker is operated by manually pivoting the operating handle 160 from its "off" position (FIG. 7) to its "on" position (FIG. 8). The operating thrust of the handle movement is used to erect the toggle formed by the sub-handles 172 and the ball-holding link 178 previously described. During the closing movement of the handle, thrust is applied by link 178 along a line that biases actuators counterclockwise as viewed in FIG. 7. After latch portions 216 engage the latch ends 225 of the armatures, further drive of the handle moves contact arms 182 counterclockwise. Contact engagement occurs shortly before the toggle is erected, and over-travel movement of the operating mechanism described, to lock the toggle by passing over-center, is accommodated by reason of the resilient support of contacts 186. The operating toggle remains erected when the handle is released in the "on" position because the toggle knee has passed over-center of a line between the handle pivots 174, 176 and the ends 210 of the ball lever 204, the handle then being arrested by the stops 169.

The thrust drives the movable contacts 184 against the companion contacts 186. Travel of the contacts beyond their point of initial engagement builds up contact pressure between them by the compression of the contact springs 246. Contact pressure is reliably established at all four contact-pairs 184, 186 of each mechanism by virtue of the independence of each bar 242 from the other bar 244 and by the floating support of each such bar when engaged by the moving contacts 184 at the ends of each bar.

Breaker opening force is stored in the counter-pressure springs 246. Opening bias is also built up in push-off springs 254 which act between the contact arm 182 and a shoulder formation on the central insulator 128.

The latching force of actuator 200 against armature 218 is applied to the actuator 200 by pins 210, this force acting along a line which passes above the pivot 202 of the actuator on the contact arm. This thrust is directed at an angle to a line drawn between the actuator pivot 202 and the pivot pin 210 of the ball lever 204. As mentioned earlier, pins 210 form the knee of a secondary toggle, comprising either actuator 200 and the ball holding link 178. The triangular configuration of the contact arm, the armature and the latched actuator transmits the reaction force from the operating toggle 160, 178 to keep the breaker contacts together.

Overloads of either high intensity or moderate and of long duration are sensed by the combination of the bimetal 190 and the armature 218. High currents flowing through the bimetal attract the armature toward the bimetal for fast release. Overloads of long duration produce heating and subsequent deflection of the bimetal for a time-delay response. The movement of the bimetal by attraction or heat-induced deflection is transmitted to the armature 218 through the calibrating screw 234. In either event the movement of the armature away from its latched position frees the actuator 200 for counterclockwise pivotal movement. Such movement of the actuator in the tripped mechanism collapses the secondary toggle of the tripped pole and causes reverse shift of the pin 210 at the opposite end of the ball lever 204. Actuator 200 of the untripped pole is then biased in the direction to release the actuating toggle of the untripped pole. Both contact arms are then free of restraint by the actuating toggle, and are driven to the open circuit position by the force of their associated push-off springs 254, with initial impetus from contact springs 246. A similar mechanism is described in detail in U.S. Patent 2,662,949 to Christensen et al. which is assigned to the assignee hereof. In the present circuit breaker, the toggle linkage operated by the handle is disposed above and generally in line with the elongated contact arms that are operated thereby, unlike the mechanism in the Christensen et al. patent wherein the handle and toggle linkage are disposed laterally of the elongated contact arms.

Various modifications of the internal circuit breaker mechanism and of the external circuit breaker configuration in relation to the bus assembly will occur to those skilled in the art, on the basis of the foregoing disclosure. A variation which has been found meritorious involves contacts 184 on the moving contact arm and contacts 186 in the companion contact assembly. Barrier 194 may be omitted and the two contacts 184 on each sub-arm of the pivoted contact arm may be united, so that the two sub-arms then carry two elongated contact bars, one contact bar on each sub-arm and each such contact bar extending across both companion contact members 242 and 244. In the closed condition of the circuit breaker as thus modified, there are still four reliably established points of contact between the moving contact arm and the companion contact assembly. In a still further modification, all four contacts 184 may advantageously be united into a single large contact and contact members 242 and 244 may likewise be united into a single copper plate, rockably supported by its bias springs. Such large single contacts as substitutes for the small contacts 184 and 186 actually illustrated have the advantage of large thermal inertia and relatively large surface areas available for heat dissipation, and thus such large contacts are effective to minimize temperature rise of the contacts and to withstand arcing abuse when interrupting large load currents and short circuit currents.

Although several embodiments of the invention have been shown and described, it will be apparent that various changes and modifications may be made therein by those skilled in the art. Consequently, the invention should be broadly construed in accordance with its full spirit and scope.

What is claimed is:

1. A panelboard comprising, an enclosure having a back wall, end walls, and rectangular side walls, circuit breaker mounting and connecting means for at least one row of modular cased branch circuit protective devices, said means including a bus assembly having plural bus bars within an insulator, said bus bars having respective input ends spaced from an adjacent end wall of said enclosure, said insulator having a housing portion forming respective partial enclosures about said input ends, said bus assembly including a plurality of terminals for engagement by said branch circuit devices carried by said insulator and connected to said bus bars therein, and a main circuit interrupter having a pedestal portion and a housing portion extending upwardly therefrom and disposed between the opposite ends of the pedestal portion and adjacent one side thereof, said pedestal portion having an external configuration complementary to said bus assembly housing portion, a pair of load terminals disposed on said pedestal portion at said one side thereof and a pair of line terminals on said pedestal portion at the opposite sides of said upstanding interrupter housing portion, a two-pole circuit interrupter mechanism in said interrupter housing portion and extending downward into said pedestal portion, high-current conductors extending from said line terminals into said pedestal portion, toward the opposite side of said pedestal portion and connected to respective poles of said circuit interrupter mechanism, said main circuit interrupter being secured to said bus assembly housing portion and said load terminals being connected to said input ends of said bus bars.

2. A two-pole circuit interrupter including a casing of molded insulation including a pedestal portion and a housing portion extending upwardly from said pedestal portion and disposed between the opposite ends of the pedestal portion and adjacent one side thereof, a pair of load terminals and a pair of line terminals disposed at one side of said pedestal portion and arranged so that both load terminals are interposed between the line terminals, said line terminals having openings directed toward the side of the pedestal opposite said one side and at a level to admit line wires extending across the pedestal at opposite sides of said housing portion, and a two-pole circuit interrupter mechanism in said housing portion extending downward into said pedestal portion and having an operating handle at the top of said housing portions.

3. A circuit breaker having a pedestal portion and a housing extending upwardly therefrom and disposed between the opposite ends of the pedestal portion and adjacent one side thereof, a pair of terminals disposed on said pedestal portion at said one side thereof and at opposite sides of said upstanding housing portion, a two pole circuit breaker mechanism in said housing and extending into said pedestal portion below said housing, and high-current conductors extending from said terminals into said petestal portion, toward the opposite side o fsaid pedestal and connected to respective poles of said circuit breaker.

4. A panelboard comprising a rectangular enclosure having a back wall, elongated side walls, and a pair of end walls, mechanical mounting and electrical connecting means for branch circuit protective devices on said back wall including securing means for at least one row of branch-circuit protective devices at a series of branch-circuit protective device receiving positions, and further including a bus assembly having portions for cooperation with respective terminals of branch-circuit protective devices when placed in such positions, said bus assembly having a plural bus input terminal portions at one end thereof for engagement by either main-line connectors or the load terminals of a main-circuit protective device, said bus input terminal portions being equally spaced from one of said end walls and having a minimal prescriber separation from said end wall, and a main-circuit protective device having an enclosure confined substantially to the space bounded at one side by said one end wall and at the opposite side by said bus input terminal portions, the enclosure of said main circuit protective device containing multiple circuit-interrupting means each having a load terminal and a line terminal connector, said load terminals being aligned with and secured to said bus input terminal portions, and said line terminal connectors being spaced from said one end wall by substantially said minimal prescribed separation and having wire-receiving openings facing said one end wall and proportioned for high-current wires, and said one end wall having an opening for admitting such wires.

5. A panelboard comprising a rectangular enclosure having a back wall, elongated side walls, and a pair of end walls, mechanical mounting and electrical connecting means on said back wall for branch-circuit protective devices including securing means for at least one row of branch-circuit protective devices at a series of branch-circuit protective device receiving positions and further including a bus assembly having portions for cooperation with respective terminals of branch-circuit protective devices when placed in such positions, said bus assembly having plural bus input terminal portions at one end thereof, said bus input terminal portions being equally spaced from one of said end walls, and a main-circuit protective device having an insulated enclosure confined substantially to the space bound at one side by said one end wall and at the opposite side by said bus input terminal portions, the enclosure of said main-circuit protective device containing plural circuit interrupting means each having a load terminal and a line terminal connector, said load terminals being aligned with and secured to said bus input terminal portions and said line terminal connectors being substantially aligned laterally with said bus input terminals and spaced from said one end wall by a minimal prescribed separation, said line terminal connectors being immediately adjacent laterally to said load terminals and separated therefrom by insulating barriers and said line terminal connectors having wire-receiving openings facing said one end wall, said openings being directly accessible to high-current wires when admitted into said rectangular enclosure through said one end wall.

6. A panelboard comprising a rectangular enclosure having a back wall, elongated side wall, and a pair of end walls, mechanical mounting and electrical connecting means on said back wall including securing means for at least one row of branch-circuit protective devices at a series of branch-circuit protective device receiving positions, said mounting and connecting means also including a bus assembly having portions for cooperation with respective terminals of branch-circuit protective devices when placed in said positions, said bus assembly having a pair of bus input terminal portions at one end thereof, insulated from each other and equally spaced from one of said end walls, and a two-pole main-circuit protective device having a pair of load terminals, a pair of line terminal connectors, and a pair of circuit interrupting means interposed, respectively, between one of said load terminals and one of said line terminal connectors, said load terminals being laterally adjacent each other but separated by interposed insulation and being aligned with and secured to said bus input terminal portions, said line terminal connectors being substantially aligned laterally with said load terminals, said line terminal connectors being disposed relatively remote from each other but immediately adjacent to said load terminals respectively and separated therefrom only by respective interposed insulating barriers and said line terminal connectors having wire-receiving openings facing said one end wall, said main-circuit protective device having an enclosure of insulation confined substantially to the space bounded at one side by said one end wall at at the opposite side by said bus input terminal portions, the enclosure of said protective device having an upstanding portion for containing portions of said circuit interrupting means and said upstanding portion being confined laterally between the mutually closest parts of the openings of said line terminal connectors for disposition between high-current main-circuit wires when admitted into said enclosure through said one end wall and extending directly to said openings.

7. A panelboard comprising a rectangular enclosure having a back wall, elongated side walls, and a pair of end walls, mechanical mounting and electrical connecting means on said back wall including securing means for at least one row of branch-circuit protective devices at a series of branch-circuit protective device receiving positions, said mounting and connecting means including a bus assembly having portions for cooperation with respective terminals of branch-circuit protective devices when placed in said positions, said bus assembly having a pair of bus input terminal portions at one end thereof, insulated from each other and equally spaced from one of said end walls, and a two-pole circuit breaker having a pair of load terminals laterally adjacent each other but separated by interposed insulation and aligned with and secured to said bus input terminal portions and having a pair of line terminal connectors substantially aligned laterally with said load terminals, said circuit breaker being of the type including side-by-side circuit interrupting mechanisms having a common manual actuator and coordinated simultaneous overload tripping means, each circuit interrupting mechanism being interposed between a respective one of said load terminals and a corresponding one of said line terminal connectors, said line terminal connectors being disposed relatively remote from each other but immediately adjacent to said load terminals respectively and separated therefrom only by respective interposed insulating barriers and said line terminal connectors having wire-receiving openings facing said one end wall, said circuit breaker having an insulated enclosure confined substantially to the space bounded at one end of said one end wall and at the opposite side by said bus input terminal portions, said insulated enclosure having an upstanding mechanism-containing portion confined laterally between the mutually closest parts of the openings of said line terminal connectors for disposition between high current main-circuit wires when admitted into said enclosure through said one end wall so as to extend directly to said connector openings.

8. A panelboard comprising a rectangular enclosure having a back wall, elongated side walls, and a pair of end walls, branch-circuit protective device mounting and connecting means on said back wall including means spaced forward of said back wall and having formations for securing at least one row of branch-circuit protective devices at a regularly spaced series of branch-circuit protective device receiving positions, said mounting and connecting means including a bus assembly having portions for cooperation with respective terminals of said branch-circuit protective devices, said bus assembly having a pair of bus input terminal portions at one end thereof, insulated from each other and equally spaced from one of said end walls and spaced forward of said back wall, and a two-pole circuit breaker having a pair of load terminals laterally adjacent each other but separated by interposed insulation and aligned with and secured to said bus input terminal portions and said two-pole circuit breaker having a pair of line terminal connectors substantially aligned laterally with said load terminals, said circuit breaker being of the type including side-by-side circuit interrupting mechanisms having a common manual actuator and coordinated simultaneous overload tripping means, each circuit interrupting mechanism being interposed electrically between one of said load terminals and a corresponding one of said line terminal connectors, said line terminal connectors being disposed relatively remote from each other but immediately adjacent to said load terminals respectively and separated therefrom only by respective interposed insulating barriers and said line terminal connectors having wire-receiving openings facing said one end wall, said circuit breaker having an enclosure of insulation containing said circuit interrupting mechanisms and said enclosure being confined substantially to the space bounded at one side by said one end wall and at the opposite side by said bus input terminal portions, said enclosure of insulation having a pedestal portion against said back wall and having an upstanding portion confined laterally between the mutually closest parts of the openings of said line terminal connectors for disposition between high-current main-circuit wires when admitted into said enclosure through said one end wall and so as to extend directly to said connector openings.

References Cited by the Examiner
UNITED STATES PATENTS

| | | | |
|---|---|---|---|
| 1,872,296 | 8/32 | Jennings | 317—119 |
| 2,902,632 | 9/59 | Stanback et al. | 317—119 |
| 2,902,560 | 9/59 | Stanback et al. | 200—88 |
| 2,904,655 | 9/59 | Gelzheiser et al. | 200—88 |
| 2,942,157 | 6/60 | Davis | 317—119 |
| 2,961,519 | 11/60 | Sadowsky et al. | 200—168 |
| 3,064,106 | 11/62 | Savage | 200—168 |

JOHN F. BURNS, *Primary Examiner.*

LARAMIE E. ASKIN, *Examiner.*